United States Patent Office 2,926,184
Patented Feb. 23, 1960

2,926,184

THERMALLY-PREPARED LIQUID, METAL-ORGANIC MATERIAL AND ITS PREPARATION

Glenn E. Irish and Lewis F. Gilbert, Detroit, Mich., assignors to Ethyl Corporation, New York, N.Y., a corporation of Delaware No Drawing. Application May 31, 1956
Serial No. 588,248

12 Claims. (Cl. 260—448)

This invention relates to new compositions of matter and processes for preparing these compositions. More particularly, this invention relates to a new and useful type of liquid, metal-organic material which is particularly useful in the chemical and allied arts. This is a continuation-in-part of our co-pending application, Serial No. 321,508, filed November 19, 1952, now abandoned.

Heretofore it has been proposed to use metallic chelate salts of various chelating agents as additives to hydrocarbons. Heavy metal derivatives of $\beta$-diketones, such as acetylacetone, benzoylacetone and their alkyl, aralkyl and aryl homologues have been proposed as antiknock agents. The patent literature also contains references to the use of metallic $\beta$-diketone derivatives and their homologues, such as the metal acetylacetonates, propionylacetonates, formylacetonates, and the like, as additives to motor fuel to beneficially effect the efficiency of combustion in internal combustion engines. Metallic chelate salts have also been proposed as additives to improve the combustion characteristics of relatively nonvolatile hydrocarbon fuels, such as fuel oils, bunker oils, and the like. However, as indicated in U.S. Patent 2,591,503, these metallic chelate salts possess a number of shortcomings—they are solids and are thus difficult to blend with and possess very limited solubility in various hydrocarbons. Moreover, these metallic chelate salts when used as motor and diesel fuel additives are not readily inducted into the combustion chambers and thus contribute to the formation of induction system deposits, cause clogging of fuel lines, jets, orifices, screens, etc., and in general interfere with the proper functioning of the engine. Prior attempts to remedy these difficulties have included the use of various solubilizing and emulsifying agents so as to facilitate blending operations. Thus, it has been proposed to pre-dissolve various solid, metallic chelate salts in benzene; toluene; xylene; crystal-free, neutral coal tar oil, and the like. However, in using such solubilizers disruption of commercial specifications of the end products are likely to be encountered, such as increased fire hazards caused by the more volatile of these solubilizing agents. Moreover, such pre-formed solutions require additional handling—e.g., special mixing or dissolving systems—and increase the cost of the improvement brought about in the end product. Thus, the art has not been sufficiently advanced to enable the most efficient and effective utilization of metallic chelate compounds as additives to various liquid hydrocarbons.

An object of this invention is to provide new compositions of matter prepared from certain normally-solid, metallic chelate salts, which compositions do not suffer from the shortcomings discussed above. An additional object is to provide processes for the preparation of these new compositions of matter. A further object is to provide liquid, metal-organic material of particular utility in the compounding of volatile fuel compositions, such as fuels for spark ignition internal combustion engines and for diesel engines; non-volatile fuel compositions, such as fuel oils, bunker oils, and the like, and lubricant compositions, such as natural and synthetic lubricating oils and greases. Other objects of this invention will be apparent from the ensuing description.

The above and other objects of this invention are accomplished by providing as a new composition of matter, liquid metal-organic material obtained by heating a normally-solid, metallic chelate compound formed from a $\beta$-keto ester to a temperature above the melting point of said compound at which a permanent transformation occurs in said compound, said temperature being below the temperature at which thermal decomposition of said liquid, metal-organic material occurs. Another part of this invention is the process of preparing liquid, metal-organic material which comprises heating a normally-solid, metallic chelate compound formed from a $\beta$-keto ester to a temperature above the melting point of said compound at which a permanent transformation occurs in said compound, said temperature being below the temperature at which thermal decomposition of said liquid, metal-organic material occurs. Another part of this invention relates to a liquid hydrocarbon—e.g., gasoline, diesel fuel, fuel oil, lubricating oil—containing a minor proportion of the liquid, metal-organic material described above.

It has been discovered that when a normally-solid, metallic chelate compound formed from a $\beta$-keto ester is heated to a conversion temperature above its melting point, a permanent transformation occurs whereby, on cooling, the product remains as a permanent liquid rather than resolidifying. This behavior of metallic chelate compounds formed from $\beta$-keto esters, when heated pursuant to this invention, is anomalous; this property of thermal transformation is not shared even by closely related metallic chelate compounds, such as metallic chelates formed from $\beta$-diketones such as acetylacetone. It is apparent, therefore, that this unique property of normally-solid, metallic chelate compounds formed from $\beta$-keto esters in being converted to a permanent liquid form is tied in in some unexplainable manner with the structure of the chelating agent itself.

The above permanent transformation which occurs when the metal chelate of a $\beta$-keto ester is heated above its melting point but below the temperature at which charring or other thermal decomposition takes place is clearly evidenced by a pronounced darkening in color of the melted chelate salt. Thus, while chelate salts of $\beta$-keto esters are normally white or pale yellow, crystalline substances and retain this coloration even at their melting points, a substantial darkening in color occurs at the conversion temperature above the melting point. This darkening is ordinarily a transformation into a vivid red, blue or green color which is readily discernible to the eye. This darkening in color can readily be distinguished from thermal decomposition of the compositions of this invention, which is evidenced by charring and the production of carbonaceous residues and inorganic metal salts.

The nature of the transformation which occurs when preparing the compositions of this invention is not known and is probably complex. But, it has been found that once this transformation occurs, the resulting metallic organic material remains in the liquid state at ordinary temperatures and that no solid chemical compound can be crystallized or otherwise separated therefrom. Tests at atmospheric pressure have shown that at the temperature of the conversion no material is gained or lost. This suggests that some type of molecular rearrangement occurs in the course of the transformation.

The liquid, metal-organic material of this invention is prepared by heating under the above conditions a normally-solid, metallic chelate compound formed from a β-keto ester which ester has the formula $$R_1-C-CHR_3-C-O-R_2$$
$$\;\;\;\;\;\|\;\;\;\;\;\;\;\;\;\;\;\;\;\;\|$$
$$\;\;\;\;\;O\;\;\;\;\;\;\;\;\;\;\;\;\;\;O$$

in which $R_1$ and $R_2$ are alkyl, cycloalkyl, aralkyl, aryl, alkaryl; $R_3$ is hydrogen or alkyl. It is preferable that these R groups contain no more than about ten carbon atoms. It is also preferable to employ metal chelates of esters of acetoacetic acid because, for a given ester thereof, there is a higher metal content in the resulting product than when the same ester of a higher β-keto acid is used. Furthermore, acetoacetic acid is readily prepared from inexpensive reactants. It is particularly preferred to use metal chelates of alkyl esters of acetoacetic acid—i.e., alkyl acetoacetates in which the alkyl group contains from 1 to 10 carbon atoms—because these compounds are very readily converted into the new and useful liquid form characteristic of this invention. Moreover, these alkyl acetoacetates have a sufficiently high metal content so that when converted into the liquid form pursuant to this invention, the resulting products are well suited as additives to liquid hydrocarbons because of their excellent solubility and inductibility characteristics. The foregoing β-keto esters are known to form normally-solid chelate salts with a wide variety of metals. It is generally believed that such normally-solid chelate salts possess a coordinate linkage between the metal salt of the enol form of the β-keto ester and the oxygen atoms of the remaining carbonyl groups, the metal atom thereby becoming part of one or more six-membered rings, depending upon the coordination number of the particular metal.

The above β-keto esters are also known as esters of 2-acylalkanoic acids, that is, alkyl-2-acylalkanoates, cycloalkyl 2-acylalkanoates, aralkyl 2-acylalkanoates, aryl 2-acylalkanoates, and alkaryl 2-acylalkanoates. According to this system of nomenclature, ethyl acetoacetate is also named ethyl acetylacetate. According to this same system, the β-keto esters having the following structures:

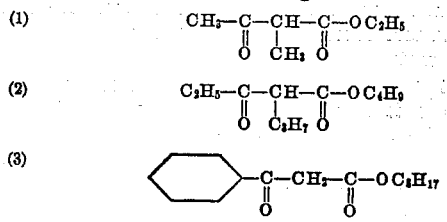

are named respectively as ethyl 2-acetylpropionate, butyl 2-propionylvalerate and octyl benzoylacetate.

It is well known that β-keto esters, as described above, form chelate salts with various metals. Thus, the starting materials in the practice of this invention are chelate salts of β-keto esters formed from the metallic elements of the periodic table comprising groups IA, IB, IIA, IIB, IIIA, IIIB, IVA, IVB, VA, VB, VIB, VIIB and VIII, including the lanthanide and actinide series of rare earth elements. These groups of the periodic table are as designated in the periodic chart of the elements appearing in "Fundamental Chemistry," 2nd edition, by H. G. Deming, reprinted in Lange's "Handbook of Chemistry," 7th edition, pp. 58–59. Thus, the new compositions of matter of this invention can contain the metallic elements of group IA, that is, lithium, sodium, potassium, rubidium, cesium, and francium. Likewise, these compositions can contain the elements of group IB, namely, copper, silver and gold. Moreover, these compositions can contain the elements of group IIA, to-wit: beryllium, magnesium, calcium, strontium, barium and radium. Similarly, the compositions of this invention can contain the group IIB elements, that is, zinc, cadmium and mercury. Likewise, these compositions can contain the metallic elements of group IIIA, namely, aluminum, gallium, indium and thallium. Similarly, the elements of group IIIB can be present in the new compositions of this invention, these elements being scandium, yttrium, lanthanum including the lanthanide series of rare earth elements having atomic numbers from 57 to 71 inclusive, and the actinide series including actinium and the elements of this series having atomic numbers of 90 or more. Likewise, the compositions of this invention can contain as the metallic element, the metals of group IVA, namely, germanium, tin and lead. Likewise, the compositions of this invention can contain the group IVB elements, to-wit: titanium, zirconium and hafnium. Similarly, the metals of group VA can be present in the compositions of this invention, that is, antimony and bismuth. In addition, vanadium, niobium (columbium), and tantalum, that is, the group VB elements, can be present in the compositions of this invention. Moreover, the elements of group VIB—chromium, molybdenum and tungsten—can be present in the compositions of this invention. Similarly, the elements of group VIIB can be present in the compositions of this invention, that is, manganese, technetium and rhenium. Furthermore, the elements of group VIII can be present in these compositions, that is, the elements iron, ruthenium, osmium, cobalt, rhodium, iridium, nickel, palladium and platinum.

It is preferable that the liquid, metal-organic material of this invention contain an alkali or alkaline earth metal. Such material is very effective in suppressing surface ignition rate when used as a gasoline additive.

Typical examples of metallic chelates of β-keto esters which can be converted into a liquid form pursuant to this invention include the lithium chelate of octyl acetylacetate (i.e., lithium octyl acetoacetate), the magnesium chelate of ethyl acetylacetate (i.e., magnesium ethyl acetoacetate), the thallium chelate of butyl acetylacetate (thallium butyl acetoacetate), the barium chelate of phenyl acetylacetate (barium phenyl acetoacetate), the copper chelate of benzyl acetylacetate (copper benzyl acetoacetate), the cadmium chelate of isopropyl 2-acetylpropionate, the sodium chelate of decyl 2-acetyloctanoate, the strontium chelate of cyclohexyl 2-propionylvalerate, the zinc chelate of tolyl 2-pentanoylheptanoate, the calcium chelate of heptyl 2-cyclohexanecarbonylpropionate, the nickel chelate of benzyl 2-phenylacetylhexanoate, and the like. Thus, the conversion of metallic chelates of β-keto esters into permanent liquid form is brought about by heating a substance consisting essentially of a normally-solid, metallic chelate compound formed from a β-keto ester to the appropriate conversion temperature. Normally, it is desirable to heat the metallic chelate in the absence of any other ingredient. However, when the molecular weight of the β-keto ester of the chelate is low, it is advantageous to heat this chelate in the presence of a small amount of the alcohol from which the ester was prepared. Thus, when thermally converting barium octyl acetoacetate (i.e., the barium chelate of octyl acetylacetate), it is helpful to carry out the heating in the presence of a small amount of octyl alcohol. However, the thermal conversion should not be carried out in a medium which is itself solid at room temperature because if this were done, the thermally-converted product could not be recovered after the mixture were cooled.

As stated above, the compositions of this invention are liquids, although occasionally they acquire a grease-like or jelly-like consistency, especially when stored at low temperatures. However, even when in this grease-like or jelly-like form, the compositions of this invention are exceedingly soluble in liquid hydrocarbons. Furthermore, if desired, they can be readily converted into the completely liquid form by simply heating the grease- or jelly-like product to a temperature about 50° C. for a few minutes prior to use.

The character of the new compositions of matter of this invention can best be illustrated by specific examples of their preparation. It will be noted from the following specific examples in which all parts and percentages are by weight that the precise temperature at which the transformation occurs is dependent upon the nature of the metal contained in the chelate and the particular β-keto ester from which the chelate was prepared.

EXAMPLE I

To a distillation flask partially submerged in an oil bath was added about 100 parts of barium octylacetoacetate containing 23.9 percent of barium. Heat was applied to the oil bath and at between 95 and 96° C. the material in the flask melted. When the temperature reached about 150° C., the material was transformed into a red oil which remained in the liquid state of aggregation subsequent to discontinuing the heating and reducing the temperature of the product to room temperature.

EXAMPLE II

Approximately 90 parts of lithium octylacetoacetate containing 3.16 percent of lithium was placed in the flask of the apparatus described hereinbefore. The material was then thermally treated by applying heat to the oil bath. At about 99° C. the lithium octylacetoacetate melted. As the temperature was increased to about 160° C., the material was gradually transformed to a reddish-colored oil. This transformation or conversion occurred rapidly and completely at about 185° C. The material when cooled to room temperature remained as a red oil.

EXAMPLE III

Approximately 15 parts of magnesium octylacetoacetate containing 5.02 percent of magnesium was placed in the apparatus described in Example I. The oil bath was heated to a temperature of 145° C. The solid material was thereby transformed to a clear liquid which solidified on cooling. Upon reheating this substance, it was gradually transformed to an orange-colored liquid. The temperature of the oil bath was then raised to 190° C. and the aforesaid transformation in color occurred more rapidly. The material was then cooled to room temperature whereby a reddish-brown solid having the appearance of grease was formed. To this substance was added 2 milliliters of octyl alcohol and the resulting solution was heated to 180° C. thereby forming a reddish-brown liquid. This material was then cooled to room temperature and the resulting product remained as a reddish-brown liquid.

EXAMPLE IV

Approximately 5 parts of nickel octylacetoacetate containing 11.14 percent of nickel was placed in a test tube. By means of a Bunsen burner, this substance was heated for a period of about 10 minutes. It was noted that a green-colored liquid was produced by this thermal treatment. The material was then cooled to room temperature and under these conditions the material remained as a liquid.

EXAMPLE V

Approximately 10 parts of sodium octylacetoacetate was placed in a test tube and heated by means of a Bunsen burner. When the temperature reached about 70° C., the material melted. Upon raising the temperature to about 190° C., the material was converted to an oil of a reddish-brown color. The material was then reduced to room temperature and it was found that the material remained in the liquid state of aggregation.

EXAMPLE VI

Approximately 5 parts of magnesium octylacetoacetate was placed in a test tube and heated by means of a Bunsen burner. This substance was heated for a period of approximately 5 minutes. During this time the following changes in physical characteristics occurred. First, the powder melted forming a clear liquid. Then with continued heating this liquid changed to a ruby-red liquid amounting to approximately 1 milliliter.

EXAMPLE VII

To the apparatus described in Example I was added approximately 10 parts of calcium octylacetoacetate. The oil bath was heated to a temperature of about 148° C. for a period of about 45 minutes. During this period, the original powder was transformed into a cloudy yellow liquid which subsequently formed a yellowish precipitate and an orange-red liquid. Continued heating at 148° C. for approximately 3 hours produced no apparent additional transformations.

The preceding seven examples are illustrative of the methods of preparing the novel compositions of matter of the present invention. The following specific examples wherein all parts and percentages are by weight were conducted in an attempt to clarify the mechanism of the unique transformations which occur in the processes of this invention.

EXAMPLE VIII

To an all-glass distillation apparatus having a distillation flask submerged in an oil bath was added 114.9 parts of freshly-purified barium octylacetoacetate having a melting point of 95–98° C. This material was heated in vacuo for 7 hours at 150° C., while concurrently condensing and collecting the volatile products so obtained. The process proceeded smoothly and the rate of this reaction as measured by the yield of volatile products was approximately 0.10 milliliter per minute for the first 2 hours and 0.036 milliliter per minute thereafter. At the end of the thermal treatment, 19 parts of volatile product was obtained amounting to an over-all recovery of 17 percent of the starting material. The composition of the distillate products was determined by infrared technique and was found to be 23 percent n-octyl alcohol and 77 percent of an ester, probably n-octylacetate. The residue obtained by the aforesaid thermal treatment was a red resinous material containing 30.9 percent of barium, whereas barium octylacetoacetate theoretically requires 26.1 percent of barium.

To establish whether the thermal treatment of barium octylacetoacetate as described in Example VIII produced products formed through the decomposition of octylacetoacetate, a possible primary decomposition product of barium octylacetoacetate, the thermal stability characteristics of n-octyl acetoacetate were investigated. This investigation is described in Example IX.

EXAMPLE IX

To the glass apparatus described in Example VIII was added about 19.6 parts of octylacetoacetate previously purified by fractional distillation at 100.5 to 101.0° C. under reduced pressure of 2 millimeters of mercury. The procedure essentially as described in Example VIII was repeated by heating the purified octylacetoacetate at 175° C. for 16 hours under an atmosphere of nitrogen. At the end of this time, the sample was analyzed for composition changes. Infrared spectrum, density, and refractive index data indicated that the heated sample was identical with the original.

The data obtained in Example IX lead to the conclusion that inasmuch as octylacetoacetate is apparently thermally stable under the conditions of the thermal treatment of the metallic derivatives thereof, the chelate structure is probably capable of fission under thermal conditions and that the mechanism of such cleavage is apparently of a complex nature.

EXAMPLE X

To a glass distillation apparatus essentially of the type described in the preceding Example VIII was added about 15 parts of barium ethylacetoacetate. The thermal treatment comprising heating this material through the agency of the oil bath to temperatures of between about 160 to 180° C. was carried out. This heating was continued for a period of about 30 minutes. During this treatment the following physical changes occurred. When the temperature reached 140° C., the white barium ethylacetoacetate powder formed a yellowish liquid. When the temperature reached between about 160–180° C., a clear liquid distilled from the flask and was condensed and collected in an Erlenmeyer flask. During this evolution of distillable vapors, the yellowish liquid changed to a liquid having a reddish coloration. On cooling, this liquid became a viscous and tacky reddish material. The liquid condensed in the Erlenmeyer flask had a refractive index of 1.3722 at 18.9° C.

EXAMPLE XI

Approximately 90 parts of lithium octylacetoacetate was placed in the distilling flask of the glass apparatus described hereinbefore. A pressure of about 1 millimeter of mercury was maintained throughout the apparatus and the oil bath was heated to temperatures between about 160 and 200° C. This heating was conducted for a period of about 90 minutes during which time the essentially white-powdery lithium octylacetoacetate changed first to a reddish-colored liquid with the concurrent evolution of condensable vapors from the distillation flask. Upon the completion of this procedure the refractive index of the condensed liquid was determined and compared with n-octyl alcohol. This determination indicated that n-octyl alcohol was probably present in the condensed phase.

The above examples are illustrative of the novel and useful compositions of this invention and the methods for their preparation. Other new compositions of this invention are prepared by heating to the appropriate conversion temperature the following normally-solid, metallic chelates of β-keto esters: The potassium chelate of butyl acetylacetate, the calcium chelate of pentyl 2-acetylbutyrate, the strontium chelate of hexyl 2-propionylpropionate, the zinc chelate of nonyl 2-acetylhexanoate, the iron chelate of phenyl 2-pentanoylhexanoate, the lead chelate of ethyl 2-butyrylbutyrate, the magnesium chelate of 2-decyl 2-acetylpropionate, and the like. In each instance the conversion temperature is reached when the pronounced color change discussed above occurs.

The new compositions of matter of this invention are of particular utility in the compounding of antiknock fluids, volatile fuel compositions, and the like. This utility, at least in part, results from the unique solubility and inductibility characteristics of the compositions of our invention. Therefore, the heavy metal compositions of the present invention, that is, those compositions containing such metals as lead, thallium, iron, nickel, manganese, copper, cobalt, chromium, thorium, molybdenum, vanadium, tungsten, cerium, and the like, can be effectively utilized both as constituents of antiknock fluids and as antiknock additives to fuels for spark-ignition internal combustion engines. Likewise, many of the compositions of this invention can be effectively utilized as fuel and lubricating oil additives to obtain the beneficial effectiveness of the metallic components in minimizing octane number requirement increase, reducing surface ignition, increasing storage stability, imparting wear reduction effectiveness, improving cetane ratings, alleviating spark plug fouling and other problems associated with internal combustion engines of both the spark and compression ignition types. Therefore, those compositions of the present invention containing such materials as, for example, cobalt, nickel, calcium, strontium, magnesium, iron, copper, uranium, molybdenum, vanadium, zirconium, beryllium, platinum, palladium, thorium, chromium, aluminum, cerium, and the like, can be dissolved and intimately mixed with fuels for internal combustion and diesel engines and with lubricating oils and other unctuous solvents to impart the aforesaid beneficial effects. Likewise, many of the new compositions of matter of our invention can be effectively utilized in bunker oils and in furnace oils to partake of the properties of some of the metals in improving the combustion characteristics of such materials.

The following specific examples illustrate the preparation of various compositions containing the novel products of this invention. Unless otherwise specified, all parts and percentages are by weight.

EXAMPLE XII

To 100,000 parts of a commercially-available gasoline composed by volume of 45.2 percent of paraffins, 28.4 percent of olefins and 25.4 percent of aromatics and having an initial boiling point of 98° F., a 50 percent boiling point of 228° F. and a final boiling point of 390° F. is added 2000 parts (2 percent) of the lithium-containing liquid product prepared according to Example II. On mixing, the resulting homogeneous fuel composition causes reduced surface ignition when used in a spark ignition engine.

EXAMPLE XIII

To 100,000 parts of a commercially-available gasoline composed by volume of 39.7 percent of paraffins, 27.7 percent of olefins and 32.6 percent of aromatics, the gasoline having an initial boiling point of 92° F., a 50 percent boiling point of 236° F. and a final boiling point of 369° F. and containing 3.0 milliliters of tetraethyllead per gallon is added 1000 parts (1 percent of the magnesium-containing, reddish-brown liquid prepared according to Example III. On mixing, the resulting homogeneous gasoline composition exhibits reduced surface ignition rate when used to operate a gasoline engine.

EXAMPLE XIV

With 100,000 parts of a gasoline composed of 70.1 percent of paraffins, 15.6 percent of olefins and 14.3 percent of aromatics and having an initial boiling point of 94° F., a 50 percent boiling point of 208° F. and a final boiling point of 385° F. is blended 500 parts (0.5 percent) of the nickel-containing, green-colored liquid prepared according to Example IV. The resulting homogeneous fuel possesses improved antiknock properties.

EXAMPLE XV

To 100,000 parts of a hydrocarbon jet fuel of JP–4 grade having a 10 percent boiling point of 221° F., an 80 percent boiling point of 359° F., a 90 percent boiling point of 379° F. and a final boiling point of 480° F. is added 100 parts (0.1 percent) of the barium-containing, red oil prepared according to Example I. After mixing, the resulting jet fuel possesses improved combustion characteristics and forms less deposits than a corresponding untreated fuel.

EXAMPLE XVI

With 100,000 parts of a diesel fuel having a cetane number of 51.7, a heat content of 19,620 B.t.u. per pound and a 50 percent boiling point of 509° F. is blended 1500 parts (1.5 percent) of the sodium-containing, reddish-brown oil prepared according to Example V. The resulting homogeneous diesel fuel possesses improved combustion efficiency and causes less engine deposits than a corresponding untreated diesel fuel.

EXAMPLE XVII

To 100,000 parts of a petroleum hydrocarbon lubricating oil having an API gravity at 60° F. of 30.3, a viscosity index of 154.2, a Saybolt viscosity of 178.8 Saybolt Universal Seconds (SUS) at 100° F. and 52.0 SUS at 210° F. is added 1000 parts (1 percent) of the barium-containing, red oil prepared according to Example I. After mixing, the resulting homogeneous lubricating oil is found to have less deposit-forming tendencies when used as a crankcase lubricant for a gasoline engine as compared with the corresponding untreated oil.

On the basis of the above illustrative examples, one skilled in the art will now clearly understand how to prepare the various improved hydrocarbon compositions of this invention.

The property of the new compositions of this invention in reducing surface ignition when employed as gasoline additives was shown by conducting a series of engine tests using the test equipment and method described in U.S. Patent 2,728,648. In these tests a gasoline engine equipped with an electronic surface ignition counter was operated on a leaded gasoline and the number of surface ignitions occurring during the test was determined by means of this counter. These tests thus established a baseline value for surface ignition rate occurring in the absence of an additive of this invention. Then, typical leaded gasolines of this invention were prepared by blending appropriate quantities of liquid, metal-organic materials of this invention with individual portions of the same leaded gasoline. The gasolines of this invention were then subjected to the same test procedure and the rate of surface ignition determined. All of the fuels in these tests contained 3.0 milliliters of tetraethyllead per gallon. The results of these tests are shown in Table I.

*Table I—Effect of additives on surface ignition rate*

| Additive | Additive Conc., g. metal/gal. | Surface Ignition Rate, Percent of Baseline |
| --- | --- | --- |
| None | | 100 |
| Liquid product made from barium octyl acetoacetate | 0.1 | 37 |
| Liquid product made from aluminum octyl acetoacetate | 0.2 | 43 |

The data shown in Table I establish that the fuels of this invention exhibit a much lower rate of surface ignition as compared with the same leaded fuel not containing an additive of this invention.

To demonstrate the surprising solubility and hence engine inductibility characteristics of the new compositions of the present invention, reference is made to Table II listing diverse organic substances in which such compositions have been found to be more soluble than the corresponding starting materials. In each case, the compound of the present invention is described by means of the metallic $\beta$-keto ester from which it was prepared.

*Table II—Improved solubility characteristics of permanently transformed metallic $\beta$-keto esters*

| Composition | Solvent |
| --- | --- |
| Barium octylacetoacetate | commercial gasoline. acetone. ether. benzene. hexane. octyl alcohol. |
| Lithium octylacetoacetate | commercial gasoline. |
| Barium ethylacetoacetate | acetone. octyl alcohol. |
| Magnesium octylacetoacetate | octyl alcohol. |
| Calcium octylacetoacetate | Do. |
| Nickel octylacetoacetate | commercial gasoline. |
| Sodium octylacetoacetate | Do. |

To further demonstrate the surprising and important engine inductibility characteristics of the new compositions of this invention the following tests were conducted using a conventional 8-cylinder automotive engine. In one test magnesium octylacetoacetate was added to gasoline and a homogeneous fuel composition containing 1.8 grams of magnesium per gallon was prepared by intimately mixing these components. The engine was then operated on this fuel composition and it was found that a considerable amount of magnesium salts had deposited in the intake manifold and on other related engine parts.

Then, an homogeneous fuel composition containing the same concentration of magnesium was prepared by intimately mixing with the gasoline magnesium-containing organic material of this invention formed by thermally converting magnesium octylacetoacetate into a permanent liquid form. It was found that when the same engine was operated on this fuel composition there was essentially no deposition of magnesium salts in the intake manifold or on other related engine parts.

The transformation temperature used in the process of this invention is contingent upon the nature of the starting material. Such temperature is, in general, in the order of between about 145° C. to about 270° C. so long as the temperature within this range is above the melting point of the metallic chelate salt. Temperatures below this range or below the melting point of the metallic chelate compound formed from a $\beta$-keto ester are ineffectual; at these lower temperatures no transformation occurs and once the heat supply has been removed, the chelate reverts to the solid state. On the other hand, temperatures much above about 270° C. result in thermal decomposition of the product.

It was pointed out above that the unique characteristic of metallic chelates of $\beta$-keto esters in being converted thermally into a permanent liquid form is not shared by metallic chelates of other chelating agents. This was clearly demonstrated by a series of comparative experiments in which magnesium octyl acetoacetate (a chelate of a $\beta$-keto ester) and magnesium acetylacetonate (a chelate of a $\beta$-diketone) were separately heated under carefully controlled conditions and samples periodically removed from the heating zone in order to determine what changes, if any, had occurred. The results of these comparative tests are shown in Table III.

*Table III—Thermal treatment of magnesium chelates of the bidentate type [1]*

| Treatment of Sample | Observations on the Treated Samples | |
| --- | --- | --- |
| | Magnesium Octyl Acetoacetate | Magnesium Acetylacetonate |
| Unheated. Heated to melting point. | A white-crystalline salt. The compound melted at 130° C., but when cooled returned to the solid state and retained its white color. | A white-crystalline salt. The compound melted at 190° C. and on cooling, reverted to a white solid. |
| Heated above the melting point. | When heated to 190° C., the compound was converted into a dark-red liquid which remained liquid when cooled to room temperature. | When heated to 245° C., and cooled, the compound retained its white color and reverted to a solid. |
| Heated further above the melting point. | When heated to 255° C., the compound was converted into a darker-red liquid without evidences of thermal deterioration. On cooling, it remained as a dark red oil. | When heated to 250° C., the compound began to char and otherwise deteriorate thermally. On cooling, the product was a solid and had a burned-brownish appearance and contained particles of carbon. |

[1] See Chem. Rev., 21, 43 and 63 (1937).

The liquid, metal-organic material of this invention is particularly useful as an additive to various hydrocarbons, especially petroleum hydrocarbons, such as gasoline (straight run, catalytically cracked, thermally cracked, thermally reformed, catalytically reformed, etc.); jet fuel; diesel fuel; light distillates; such as burner oil, gas-oil, lubricating oil, bunker oil, and the like. The amount of the liquid, metal-organic material so used is dependent upon the material itself, the type of hydrocarbon and the extent to which and the manner by which the hydrocarbon is to be improved. Generally speaking, very good improvements in the performance characteristics of liquid hydrocarbons are achieved when the liquid, metal-organic material of this invention is dissolved therein in amount ranging from about 0.005 percent to about 5 percent by weight based on the weight of the hydrocarbon. Under most conditions, amounts ranging from about 0.5 to about 2 percent by weight give very satisfactory results.

The hydrocarbon compositions of this invention can also contain other additives. Thus, the gasolines of this invention can contain antioxidants, metal deactivators, upper cylinder lubricants, etc. The diesel fuels of this invention can contain cetane improvers, antioxidants, oiliness additives, etc. Lubricating oils of this invention can contain viscosity index improvers, pour point depressants, detergent-dispersants, antioxidants, and the like.

We claim:

1. Liquid, metal organic material obtained by heating a normally solid, metallic chelate compound formed from a β-keto ester having the formula

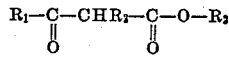

in which $R_1$ and $R_2$ are radicals containing up to about 10 carbon atoms each and are selected from the group consisting of alkyl, cycloalkyl, aralkyl, aryl and alkaryl radicals; and $R_3$ is selected from the group consisting of hydrogen and alkyl radicals containing up to about 10 carbon atoms; the heating being to a temperature above the melting point of said compound at which a permanent transformation occurs in said compound, said temperature being below the temperature at which charring of said liquid, metal organic material occurs.

2. The composition of claim 1 wherein said ester is an ester of acetoacetic acid.

3. Process of preparing liquid, metal organic material which comprises heating a normally solid, metallic chelate compound formed from a β-keto ester having the formula

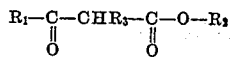

in which $R_1$ and $R_2$ are radicals containing up to about 10 carbon atoms each and are selected from the group consisting of alkyl, cycloalkyl, aralkyl, aryl and alkaryl radicals; and $R_3$ is selected from the group consisting of hydrogen and alkyl radicals containing up to about 10 carbon atoms; the heating being to a temperature above the melting point of said compound at which a permanent transformation occurs in said compound, said temperature being below the temperature at which charring of said liquid, metal organic material occurs.

4. Process of claim 3 wherein said ester is an ester of acetoacetic acid.

5. The composition of claim 1 wherein the metal of said metallic chelate compound is selected from the group consisting of alkali and alkaline earth metals.

6. The composition of claim 1 wherein said metallic chelate compound is a barium alkyl acetoacetate.

7. The composition of claim 1 wherein said metallic chelate compound is barium octyl acetoacetate.

8. The composition of claim 1 wherein said metallic chelate compound is lithium octyl acetoacetate.

9. The composition of claim 1 wherein said metallic chelate compound is sodium octyl acetoacetate.

10. The composition of claim 1 wherein said metallic chelate compound is calcium octyl acetoacetate.

11. The composition of claim 1 wherein said metallic chelate compound is aluminum octyl acetoacetate.

12. Process of claim 3 wherein the metal of said metallic chelate compound is selected from the group consisting of alkali and alkaline earth metals.

References Cited in the file of this patent

UNITED STATES PATENTS

| | | |
|---|---|---|
| 2,149,856 | McKone et al. | Mar. 7, 1939 |
| 2,151,432 | Lyons et al. | Mar. 21, 1939 |
| 2,197,498 | Guthmann | Apr. 16, 1940 |
| 2,208,253 | Flenner et al. | July 16, 1940 |
| 2,278,965 | Peski et al. | Apr. 7, 1942 |
| 2,307,075 | Quattlebaum et al. | Jan. 5, 1943 |
| 2,596,047 | Schlesinger et al. | May 6, 1952 |
| 2,654,769 | Kozacik et al. | Oct. 6, 1953 |